(12) United States Patent  
Reisinger

(10) Patent No.: US 8,095,881 B2  
(45) Date of Patent: Jan. 10, 2012

(54) METHOD FOR LOCATING A TELEPORT TARGET STATION IN A VIRTUAL WORLD

(75) Inventor: Josef Reisinger, Bornheim (DE)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 12/053,802

(22) Filed: Mar. 24, 2008

(65) Prior Publication Data

US 2009/0241036 A1    Sep. 24, 2009

(51) Int. Cl.  
*G06F 3/048* (2006.01)

(52) U.S. Cl. ........ 715/757; 715/769; 715/803; 715/804; 715/809

(58) Field of Classification Search .............. 715/757, 715/769, 803, 804, 809  
See application file for complete search history.

(56) References Cited

U.S. PATENT DOCUMENTS

| | | | | |
|---|---|---|---|---|
| 5,802,296 A | * | 9/1998 | Morse et al. | 709/208 |
| 7,433,266 B2 | * | 10/2008 | Ledeczi et al. | 367/129 |
| 2002/0188678 A1 | * | 12/2002 | Edecker et al. | 709/204 |
| 2009/0177980 A1 | * | 7/2009 | Leahy et al. | 715/757 |

FOREIGN PATENT DOCUMENTS

WO      WO 00/70489      11/2000

* cited by examiner

*Primary Examiner* — Michael Roswell  
(74) *Attorney, Agent, or Firm* — Andrea Bauer; Hoffman Warnick LLC

(57) ABSTRACT

The invention relates to a method for locating a teleport target station for teleporting between at least one teleport source station and at least one teleport target station in a virtual world, the method including: associating a specific teleport target station object with the at least one teleport target station; associating a current location with the object; and broadcasting the current location of the target station object into at least one communication channel in the virtual world.

18 Claims, 7 Drawing Sheets

METHOD FOR LOCATING A TELEPORT TARGET STATION IN A VIRTUAL WORLD

FIELD OF THE INVENTION

The invention relates generally to a computer network and, more specifically, to a method and apparatus for locating a teleport target station in a virtual world.

BACKGROUND OF THE INVENTION

Virtual worlds, such as the so called "Second Life" created by Linden Labs, is a 3D-world with inhabitants called avatars being able to create and build things. Such a world does not exist in the physical world. The world is structured in "islands" and the avatars can move internal and external to the islands.

To help visitors to find a certain destination in the virtual world, land owners often use a so-called teleport. A teleport can be described as the interaction of an avatar with a teleport station (i.e., teleport source station) in the virtual world, which brings the avatar to a predefined location, the teleport target location. Examples of such teleport source stations are simulated elevators, floors, or special rooms in a building and dedicated areas on a parcel of land. Whatever mechanism the teleport function uses, the coordinates for the teleport target location are statically provisioned inside the teleport source station. During build and change activities, the target coordinate of a teleport target station may become invalid and need to be updated.

In WO 00/70489 A1 a method and apparatus are disclosed for providing hotspots, e.g., teleports, in a virtual world. An avatar can be moved from one location to another when the avatar interacts with a hotspot, e.g., by walking through the hotspot. The hotspot contains a link which is the coordinate of the particular teleport target station.

If the number of teleport source stations and teleport target locations increases, the effort to maintain the coordinates in a teleport network increases and it may be very complex to verify that all teleport source stations are provisioned with the right target location coordinates of the respective target station.

SUMMARY OF THE INVENTION

The present invention provides a method in a virtual world for automatically configuring the teleportation system with actual target coordinates without the need of manual configuration for performing teleportation between a teleport source station and a teleport target station.

According to an aspect of the invention, there is provided a method for locating a teleport target station for teleporting between at least one teleport source station and at least one teleport target station in a virtual world, comprising: associating a specific teleport target station object with the at least one teleport target station; associating a current location with the object; and broadcasting the current location of the object into at least one communication channel in the virtual world; wherein a script running inside the teleport target station object: determines actual coordinates of the teleport target station object it is running in as first data; gathers second data by listening to broadcasts of one or more other teleport target station objects; builds a list of known teleport target stations from the first and second data gathered; and broadcasts the known teleport target stations contained in the list to neighboring teleport target station objects.

The invention enables a teleport source station to find the coordinates of a teleport target location of a respective teleport target station, configure itself automatically and avoid laborious and error-prone manual provisioning of the target coordinates. An object is introduced on the teleport target station, wherein the coordinates of the object define the target location for the teleport. A script inside the target location object regularly broadcasts the position, which is received by the teleport source stations. The teleport source stations initialize on the receipt of a broadcast message and re-configure themselves, if a teleport target location of a teleport target station changes.

The invention includes a network of teleport nodes in a virtual world, such as Second Life, which can auto detect their structure and configuration and, particularly, the actual coordinates of a teleport target station. The teleport technique itself, moving an inhabitant of a virtual world from the teleport source station to the teleport target location, is out of scope of this invention as there are several well documented ways to teleport a person after the correct target coordinates have been configured.

According to another aspect of the invention, there is provided a program product comprising a computer useable medium including a computer readable program, wherein the computer readable program when executed on a computer causes the computer to: associate a specific teleport target station object with the at least one teleport target station; associate a current location with the object; and broadcast the current location of the teleport target station object into at least one communication channel in the virtual world; wherein a script running inside the teleport target station object: determines actual coordinates of the teleport target station object it is running in as first data; gathers second data by listening to broadcasts of one or more other teleport target station objects; builds a list of known teleport target stations from the first and second data gathered; and broadcasts the known teleport target stations contained in the list to neighboring teleport target station objects.

Another aspect of the invention relates to a data processing system for execution of a data processing program, stored on a computer readable storage medium, the data processing program comprising software code portions for: associating a specific teleport target station object with the at least one teleport target station; associating a current location with the object; and broadcasting the current location of the teleport target station object into at least one communication channel in the virtual world; wherein a script running inside the teleport target station object: determines actual coordinates of the teleport target station object it is running in as first data; gathers second data by listening to broadcasts of one or more other teleport target station objects; builds a list of known teleport target stations from the first and second data gathered; and broadcasts the known teleport target stations contained in the list to neighboring teleport target station objects.

BRIEF DESCRIPTION OF THE DRAWINGS

Embodiments of the present invention will now be described by way of example with reference to the accompanying drawings in which like references denote similar elements.

The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF THE INVENTION

Figure 1:
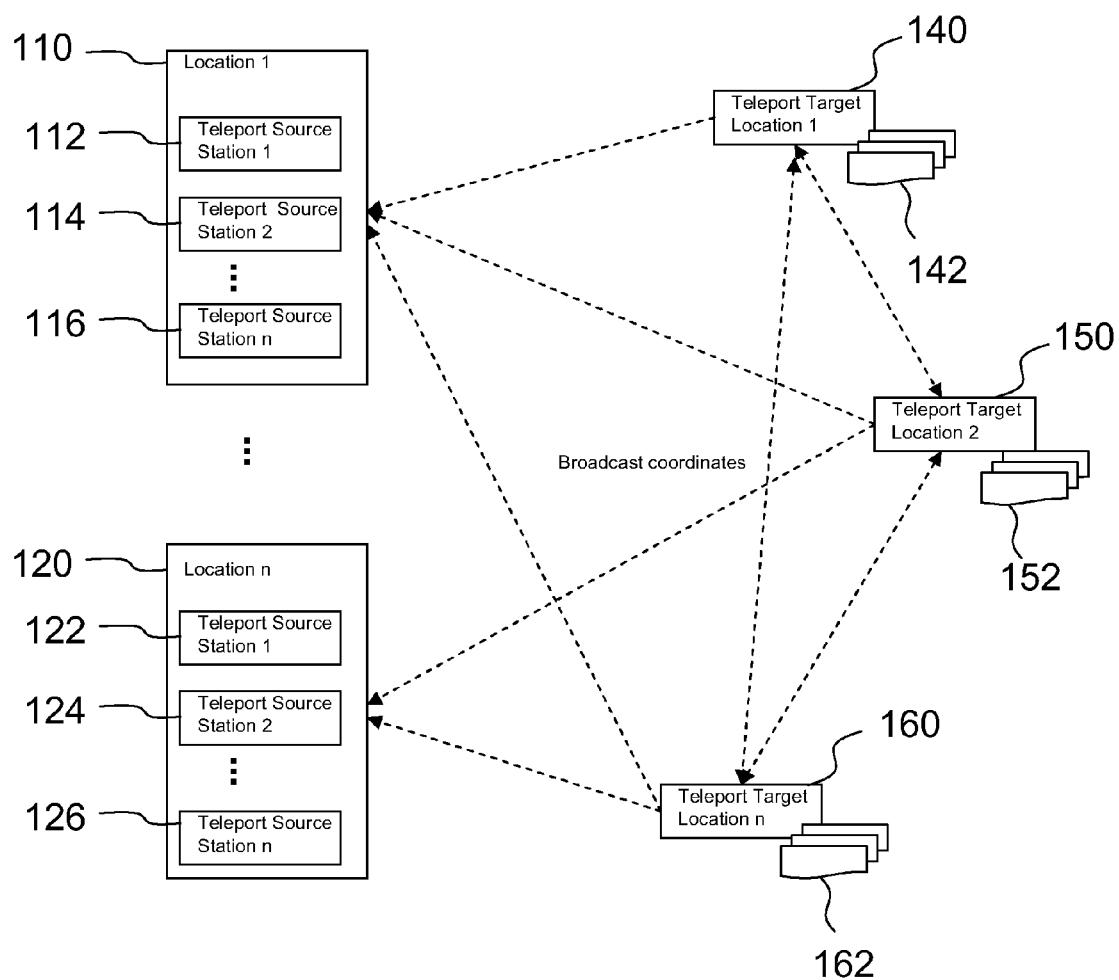
FIG. 1 depicts a plurality of sources and destinations of teleportation.

FIG. 1 depicts a block diagram depicting illustrative components for an autonomous teleport network system according to the invention. By way of example the system consists of a number (plurality) of locations 110,120 with teleport source stations 112, 114, 116, and 122, 124, 126, where an avatar may go to select one desired target out of a plurality of several (1 to n) teleport target station 140, 150, and 160 at specific teleport target locations, each equipped with a list of known nodes 142, 152, and 162, i.e., other target locations.

The source locations 110,120 may be compared to a bus-stop—one moves there to catch a bus and let oneself transport to a target destination. The various bus stops one can reach from the starting bus stop are similar to teleport source stations 112, 114, 116, of the first location 110 and teleport source stations 122, 124, and 126 of the nth location 120. The station where one leaves the bus is similar to a teleport target location 140, 150, 160.

The teleport target station 140, 150, 160 is an object in the virtual world running data processing software (a script). The teleport target station object can be anything—an invisible 1×1×1 cm$^3$ object, a big stage, etc. The avatar will always be teleported to the coordinates of that teleport target station object, preferably to the coordinates of the center of the teleport target station object.

A process performed by the script executed in a teleport target station can include:
(1) determining the coordinates of the teleport target station object it is running in;
(2) listening to broadcasts of other nearby teleport target station objects;
(3) building a list of known teleport target stations 140, 150, 160 from the data gathered in (1) and (2); and
(4) broadcasting the list of the known teleport target stations 140, 150, 160 to neighboring teleport target station objects.

Thus, by way of example, a broadcast originated by teleport target station 140, i.e., the teleport target station's object, would contain location information of teleport target stations 150 and 160. Similarly, a broadcast of the teleport target station 150 would contain location information related to the teleport stations 140 and 160 and a broadcast of the teleport target station 160 would contain location information related to the teleport stations 150 and 160. A broadcast can be understood as the transmission of a message sent on a shared medium to be intercepted and processed by a plurality of receivers.

The teleport source stations 112, 114, 116, 122, 124, and 126 are also objects in the virtual world running data processing software (a script). The script executed in a teleport source station listens to the broadcasts emitted by the teleport target stations 140, 150, 160. Each script of a teleport source station 112, 114, 116, 122, 124, 126 determines which of the multiple broadcasted messages it receives is target to its particular instance and contains data which is related to the target of the teleport function of specific teleport source station 112, 114, 116, 122, 124, 126.

By its particular design the method and system according to the invention advantageously ensure that
the accurate coordinates are configured;
only the most recent data is configured, i.e., no overwriting happens of recent up-to-date data by old data from messages straying around;
teleport target stations which are out of service are automatically removed from the auto configuration of the teleport source stations; and
source stations and target stations which do not have direct communications exchange their data via one or more intermediate repeaters.

Each teleport target station can send its own coordinates, i.e., the teleport target station object's coordinates, on a regular basis in a message that can contain, for example, the virtual-world-internal key of the teleport target station object, the coordinates of the teleport target station object, and a timestamp. The teleport source station can configure itself by linking its own name or identifier with the names of teleport target station objects contained the broadcast messages. It can derive the target name by translating the target identifier key transmitted in the message into a name. The name of the teleport target station can have a prefix, e.g., "Source4". The teleport source station can compare the name or identifier in the broadcast message with its own name or identifier. If the match is successful, the teleport source station can configure itself with the coordinates in the message as sent by the teleport target station, i.e., it updates the target settings of its teleport function with the new coordinates of the teleport target location.

Figure 2:
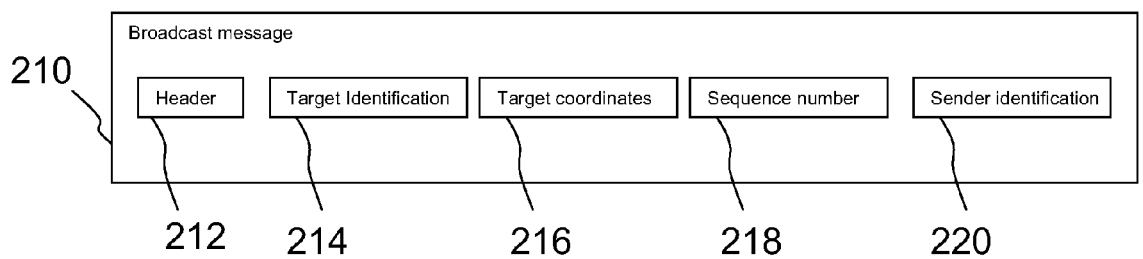
FIG. 2 depicts a layout of a broadcast message.

FIG. 2 exemplifies a layout of such a broadcast message 210 referred to in FIG. 1. The broadcast message 210 can include a header 212, which identifies the message and the version of the message protocol used; a target identification 214, which is a virtual world internal key identifying the teleport target location, whose position is broadcasted; in-world target coordinates 216 of the teleport target station; a sequence number 218 which identifies the most recent version of a broadcast message and as such avoids old messages straying around and avoids invalidating actual, recent ones; and a sender identification 220.

Figure 3:
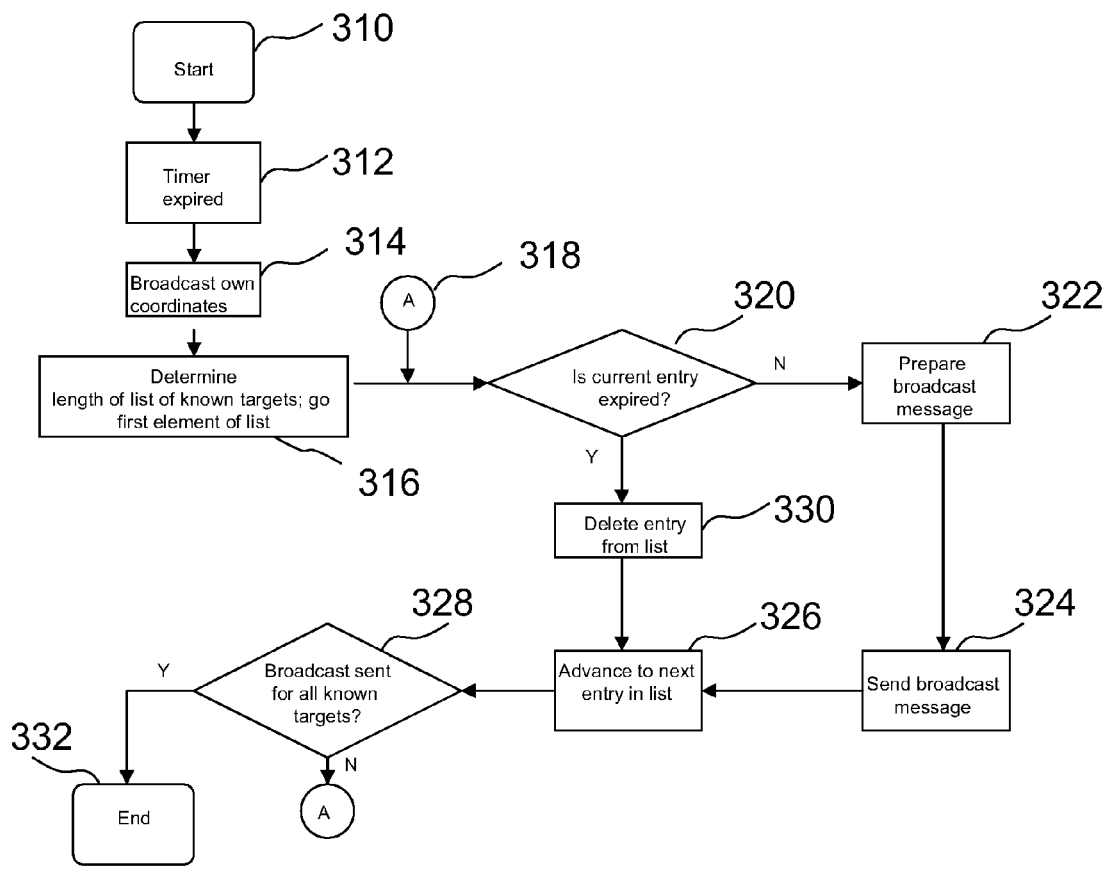
FIG. 3 depicts a flow chart showing a process performed by a teleport target station when it broadcasts its known locations.

Referring now to FIG. 3, the logic of the teleport target stations 140, 150, 160 (FIG. 1) in determining the own coordinates and building and broadcasting the known nodes list 142, 152, 162 (FIG. 1) is presented as a flow chart showing a process performed by a teleport target station when it broadcasts its known location. Broadcasting in virtual worlds is comparable to broadcasting of telecasts in the real world: the signal is aired and is received by a multitude of receivers. For teleport target stations this means to send position related data on a communication channel without knowing how many receivers they actually reach.

The broadcast is triggered by a timer, which regularly starts the execution of the process shown in the flowchart in FIG. 3. A timed approach is taken to detect stations which are no longer in service and remove them from the list of auto-configured stations. Following a start 310, the expiration of the timer is indicated in 312. In 314, the script running in the environment of a teleport target station object determines the coordinates of that object, constructs a broadcast message 210 as indicated in FIG. 2 and broadcasts the message on a known channel in the virtual world. The sequence number 218 (FIG. 2) of the broadcast message 210 is monotonously increasing compared to the last one sent. The message enables all receiving teleport source stations to inspect the broadcast and eventually, if the message applies to the source station, set the teleport target coordinates in their teleport function. A higher sequence number 218 of a given broadcast message of one particular teleport target station object invalidates a lower one.

To enable teleport source stations 112, 114, 116, and 122, 124, 126 (FIG. 1) outside the range of the broadcast from a specific teleport target station 140, 150, 160 (FIG. 1) to join the auto-configuration, each teleport target station 140, 150, 160 (FIG. 1) acts as a repeater. The repeater function can be implemented, for example, as described below.

In 316, each entry in the known teleport target stations list 142,152,162 (FIG. 1) is examined. The list may contain nodes (teleport target stations) which are taken out of operation. In 320, this situation is detected by comparing the expiration timer of the entry in question with the current time in the virtual world. If the entry has timed out, it is deleted from the list in 330 and, as a consequence thereof, gradually taken out of the auto-configuration network.

If the entry is still valid, a broadcast message as described in FIG. 2 is constructed in 322, and the message is sent out in 324. The process then advances in 326 to the next entry in the list and continues the broadcast at label 318. In 328, it is determined if broadcast messages have been sent for all known and valid target stations. If so, the process ends in 332. If not, further respective broadcast messages are sent until the messages of all known target stations have been broadcasted.

Figure 4:
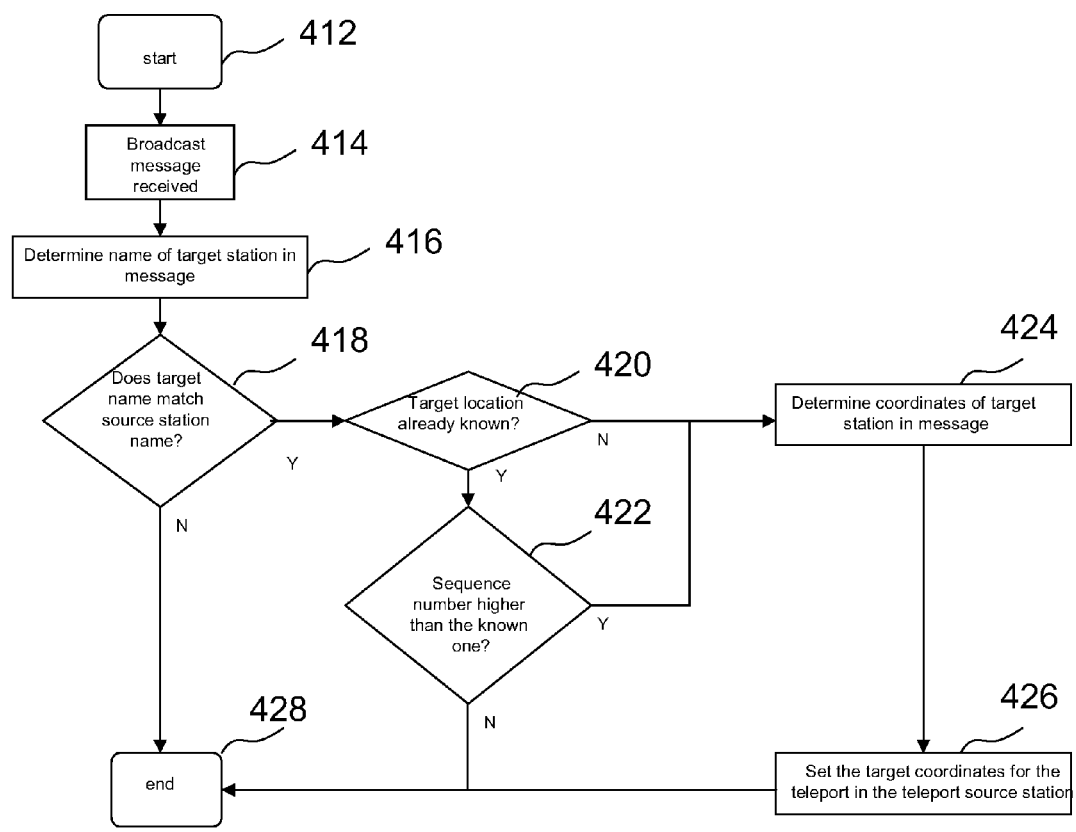
FIG. 4 depicts a flow chart describing a process taken when a teleport source station received a broadcast.

FIG. 4 illustrates a flow diagram which describes how a teleport source station 112, 114, 116, and 122, 124, 126 depicted in FIG. 1 receives and interprets the various broadcast messages of teleport target stations.

In 414, an incoming broadcast message 210 of a particular teleport target station is received. The target identification 214 is translated into a name in 416. The name is used to compare it against the name of the receiving teleport source station 112, 114, 116, 122, 124, 126. In 418, it is determined whether the determined name, for example, prefixed by a fixed string value, equals the teleport source station's own name. If this is the case, the message is considered to be targeted to this particular teleport source station 112, 114, 116, and 122, 124, 126 and ignored otherwise in 428.

In 420, it is determined if the received message is the first one received for this teleport source station. The first message is always taken as most recent as there is no further data held in the teleport source station to compare to. If this broadcast message is not the first message received, in 422, the sequence number in the received message is verified. This allows the teleport source station 112, 114, 116, and 122, 124, 126 to avoid the overwriting of more recent messages with older ones. As the teleport target station 140, 150, 160 (FIG. 1) increases the sequence number with each broadcast, only the broadcast with the highest sequence number is considered valid. All others are ignored. If the message passes the test, the particular teleport target station's coordinates are retrieved from the broadcast message (424) and the teleport function is configured such that an avatar wishing to be teleported will be moved to the coordinates found in the just received broadcast message (426).

Figure 5:
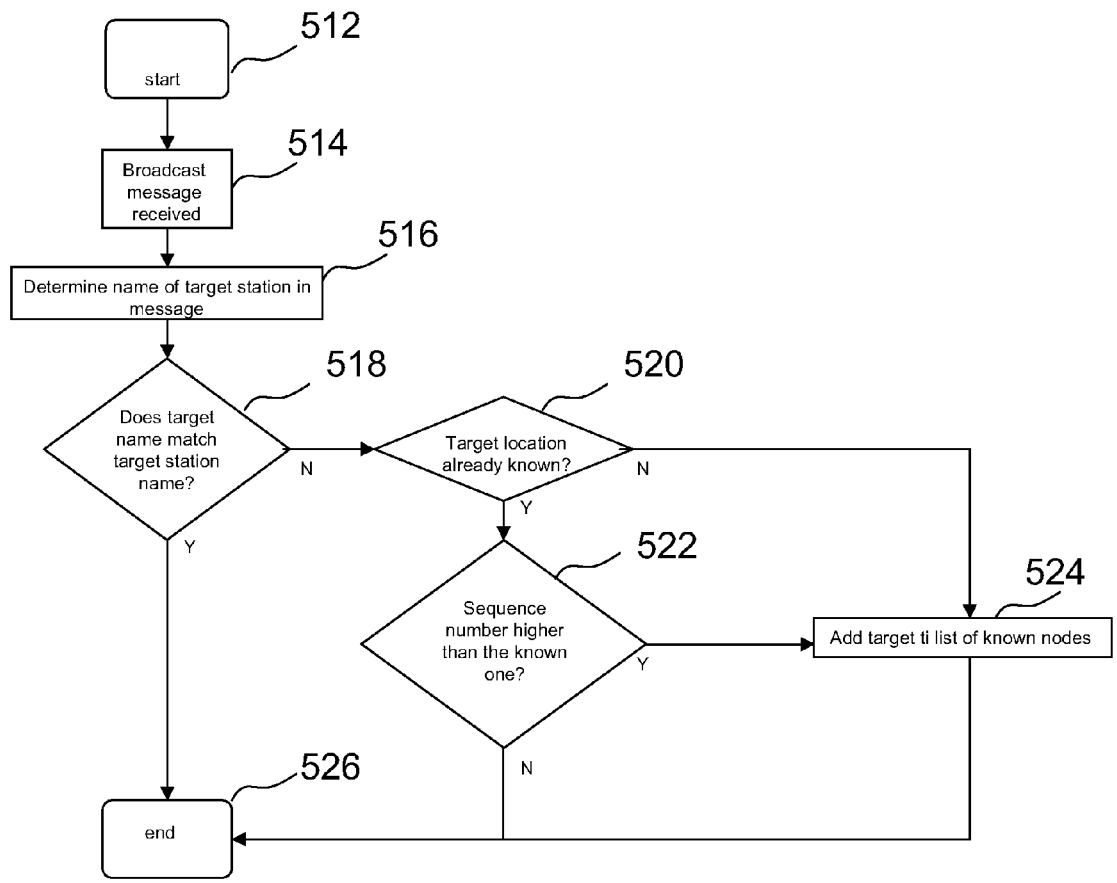
FIG. 5 depicts a flow chart describing a process taken if the teleport target station receives a broadcast message.

The flow diagram depicted in FIG. 5 describes the receiving part of the repeater function of a teleport target station 140, 150, 160 (FIG. 1). After the start 512, an incoming broadcast message 210 (FIG. 2) is received in 514. In 516, the target identification 214 is translated into a name. If the teleport target location 140, 150, 160 has the same name as this name in the broadcast message, the message is ignored in 518. This message is an "echo" of a message once sent already by this teleport target location 140, 150, 160.

If the name is different, in 520, it is determined whether this message is the first seen for the teleport target location 140, 150 or 160 identified by the message's target identification 214. If it is a repeated message by the respective teleport target station 140, 150 or 160, it is checked in 522, similar to the procedure in FIG. 4, 422, if it carries a higher sequence number 214 as the already known entry in the known nodes list 142, 152 or 162. If the message is new (N-exit of 520) or passes 522, it will be added in 524 to the known nodes list 142, 152, 162 with the actual location, which will be broadcasted after expiration of the broadcast timer as explained in FIG. 3. If the message is not new (Y-exit of 520), it is checked if the sequence number is higher than the already known. If yes, the teleport target station is added to the list of known nodes in 524 with its new location data. If no, the process jumps to end 528.

Figure 6:
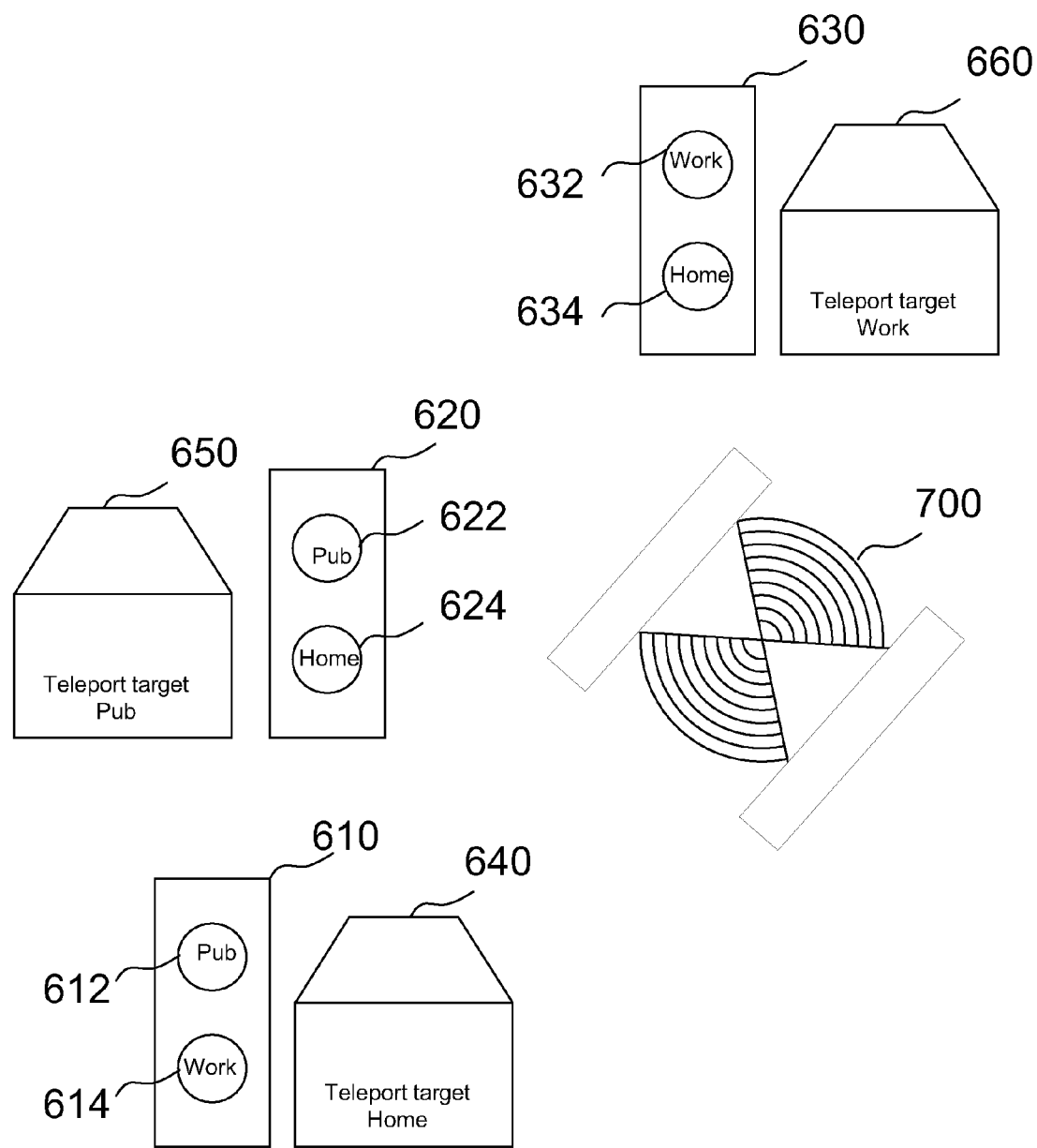
FIG. 6 depicts an example of teleport location in a virtual world.

Referring now to FIG. 6, a virtual world example of teleport source stations and target stations is shown. The area in question contains three targets 640, 650, 660 an avatar want or must regularly move to. Each of the targets 640, 650, 660 contains one object (not shown) in the virtual world, which defines the location of the respective teleport station. In the example, these objects are called "Home", "Pub" and "Work" accordingly. Each of these objects runs a script which regularly gets the object's location and broadcasts it.

The avatar uses teleport source location 610, 620, 630, which are symbolized e.g., by a rectangle with two circles, like buttons in an elevator. Each circle implements a teleport source station 612, 614, 622, 624, 632, 634. The circles 614, 632 labeled "Work" in the drawing are objects in the virtual world named "Source4Work", likewise the circles 624, 634 labeled "Home" are called "Source4Home" and the circles 612, 622 labeled "Pub" are called "Source4Pub". The occurrence of the teleport source locations 610, 620, 630 is free to a designer—it needs only just to carry a script to setup the target coordinates and allow an avatar to interact with it.

Each of these teleport source station objects runs a script which listens to the broadcasts and, as soon as they match their part of their own name after the initial "Source4", they set the target location of the teleport to the coordinates carried in the message.

If a teleport source station 614, 632 called "Source4Work" receives a message like e.g. "Work;<124,12,45>", it will set the target of its teleport function to "<124,12,45>." As the avatar interacts in an intended way with a teleport source station object, the avatar will be moved to the target location indicated by the object's label.

With this principle in place, it is possible to create rather complex teleport networks without concerns that the target coordinates of each teleport source station may be wrongly configured.

The usage of repeater nodes 700 introduces a data consistency issue: As the data of a teleport target location are held in multiple nodes of the teleport network a method needs to ensure that all data records stay consistent all times.

By way of example, one can consider this sequence of events:
  The teleport network has configured itself and is running smoothly.
  The location of the "Work"-object changes. "Work" detects the location change and broadcasts the new location.
  The teleport source stations near "Pub" receive the new location of "Work" and reconfigure them.

The "Pub" object receives the new location of "Work" and updates the known location of "Work".

Shortly after, "Home" begins its regular broadcast.

As "Home" hasn't received the new location from "Work", because "Work" is too far away and "Repeater" has not broadcasted its list yet, "Home" will send the old location of "Work" to the teleport source stations near "Pub".

The teleport source stations near "Pub" receive the new location of "Work" and reconfigure themselves with the old, now incorrect teleport target station coordinates.

"Pub" also receives the old location of "Work". It will store it in the list of know teleport target stations and send it with the next broadcast, probably making other listening teleport source stations to overwrite the correct location with the old, incorrect one.

As described in the sequence above, it may happen that two messages of a teleport target station carrying different location information are straying in the network overwriting each other. To solve this issue, in an illustrative solution a teleport target station adds a unique increasing value each time it broadcasts its own location coordinates. As the broadcast intervals are preferably multiple of seconds, the current time in seconds since the epoch (Unix-time) is sufficient. Any receiving station discards messages for a particular teleport target location with a sequence counter lower or equal the one stored already in the receiving station's data An alternative solution could be to immediately broadcast as a repeater a message upon receipt instead in regular intervals. A subsequent "broadcast storm", i.e., never ending repetition of repeated messages, can be sufficiently prevented by sending at regular intervals as described above.

During re-arrangement of the island in the virtual world, some of the teleport target stations might be removed, but still exist in the lists of the other nodes in the teleport network. Especially the teleport source stations are still configured to teleport avatars to the now nonexistent target.

As the station already maintain the sequence counter (i.e., sequence number) to enforce data integrity, as explained above, and the sequence number is up to date, i.e., corresponds to the time of the last broadcast of the teleport target station at its last location, it is easy to use the time to decide whether a particular entry is valid. If the sequence number indicates a time which is older than the current time minus a time-out value, the according entry is considered to be orphaned and the teleport target station is assumed to be out of service.

Broadcasting stations check their entries before a broadcast whether they are orphaned. If they are orphaned, they delete the entry from the list and consequently do not further broadcast it.

Teleport source stations check on regular intervals or at the start of an interaction with an avatar (if possible), whether the entry is orphaned, and if so, inform the avatar accordingly.

An example of the format of the broadcast messages exchanged between the teleport nodes is as follows:

<version-pattern> <landing-zone-key>","<landing-zone-position>","<counter> with

<version-pattern>: "%%%BCSTV3%%%"
representing the current protocol version level;
<landing-zone-key>: <lsl-key>
representing the object key in the virtual world of the landing zone object (i.e., the teleport target station object);
<landing-zone-position>: <lsl-position>
representing the vector of the position of the landing zone (i.e., location of the teleport target station object); and
<counter>Integer:
representing the time of the broadcast sent by the originating teleport target station as it is broadcasting its position. This avoids "old" location information to override more recent ones. A location message with a higher value overrides always location information with a lower value and can also be used to time-out orphaned stations.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 7:
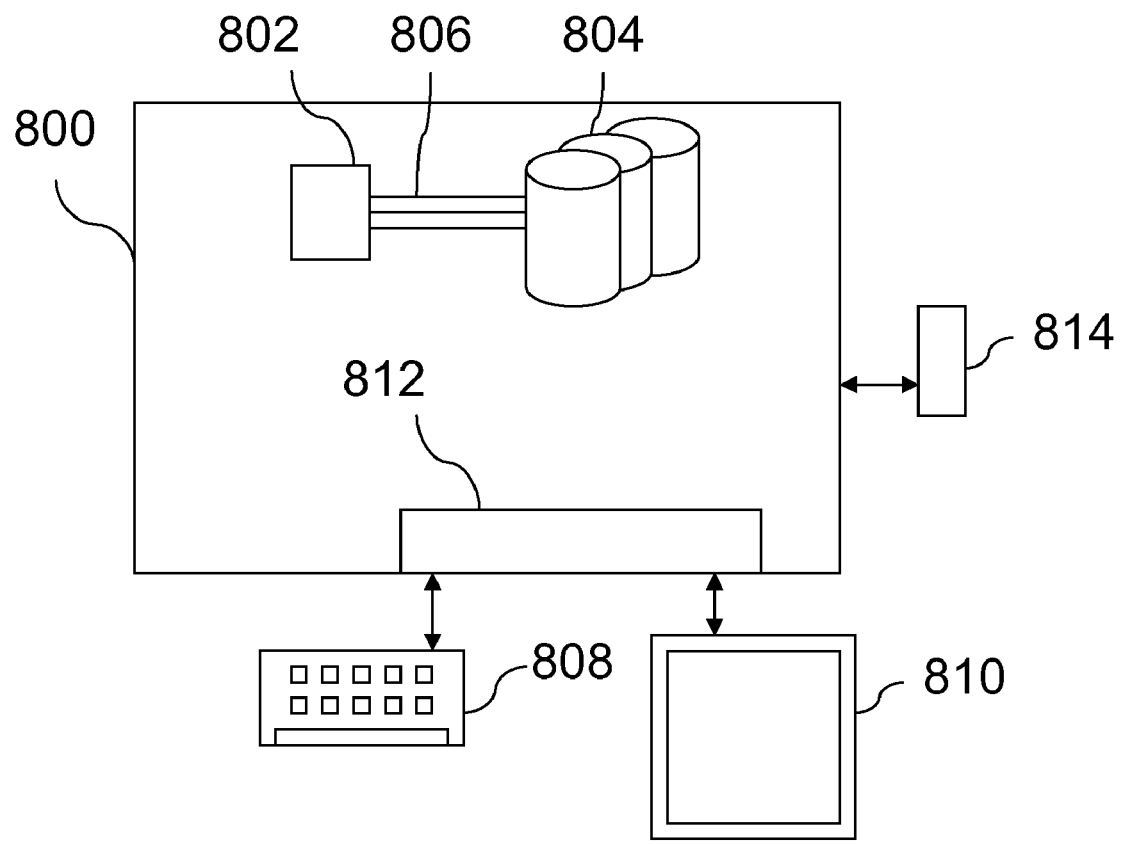
FIG. 7 depicts an embodiment of a computer system performing the invention.

An illustrative data processing system 800 as schematically depicted in FIG. 7 suitable for storing and/or executing program code will include at least one processor 802 coupled directly or indirectly to memory elements 804 through a system bus 806. The memory elements 804 can include local memory employed during actual execution of the program code, bulk storage, and cache memories which provide temporary storage of at least some program code in order to reduce the number of times code must be retrieved from bulk storage during execution. Alternatively, external memory elements can be coupled to the system 800 and the processor 802, respectively.

Input/output or I/O-devices 808, 810 (including, but not limited to keyboards, displays, pointing devices, etc.) can be coupled to the system 800 either directly or through intervening I/O controllers 812.

Network adapters 814 may also be coupled to the system 800 to enable the data processing system or remote printers or storage devices through intervening private or public networks. Modems, cable modem and Ethernet cards are just a few of the currently available types of network adapters.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method for locating a teleport target station for teleporting between at least one teleport source station and at least one teleport target station in a virtual world, comprising:
    associating a specific teleport target station object with the at least one teleport target station;
    associating a current location with the object; and
    broadcasting the current location of the object into at least one communication channel in the virtual world;

wherein a script running inside the teleport target station object:

determines actual coordinates of the teleport target station object it is running in as first data;

gathers second data by listening to broadcasts of one or more other teleport target station objects;

builds a list of known teleport target stations from the first and second data gathered; and broadcasts the known teleport target stations contained in the list to neighboring teleport target station objects.

2. The method of claim 1, wherein a broadcast message broadcasted by the teleport target station object comprises at least a teleport target identification, target coordinates, a sequence number, and a sender identification of the teleport target station object.

3. The method of claim 2, wherein the broadcast message broadcasted by the teleport target station object further comprises a sequence number for allowing an old location of the specific teleport target station object to be distinguished from a new location of the teleport target station object.

4. The method of claim 3, wherein the sequence number is increased monotonically for each successive broadcast of the teleport target station object.

5. The method of claim 1, wherein the broadcast is triggered by a timer.

6. The method of claim 1, wherein each known teleport target station entry in the list of the known teleport target stations is broadcasted one after another to neighboring teleport target station objects.

7. The method of claim 1, wherein broadcast messages received by the teleport target station, which are related to the same teleport target station object as the receiving teleport target station object, are ignored by the receiving teleport target station object.

8. The method of claim 1, wherein broadcast messages related to teleport target stations already known to the receiving teleport target station are verified with respect to their sequence numbers.

9. The method of claim 8, wherein broadcasting messages recognized as new or containing new target coordinates of a known teleport target station are incorporated in the list of known teleport target stations of the receiving teleport target station.

10. The method of claim 1, wherein a teleport target station which is no longer in service is eliminated from the list of known teleport target stations by comparing an expiration timer of the actually monitored broadcasting message with a current time in the virtual world.

11. The method of claim 1, wherein a teleport source station script of a specific teleport source station:

listens to the broadcasts emitted by the teleport target stations; and identifies a broadcasted message which contains data relevant for a teleport function of the receiving teleport source station.

12. The method of claim 11, wherein the teleport source station script configures itself by setting a target of its teleport function to actual coordinates of the teleport target station object if actual altered target data has been identified in the broadcast message.

13. The method of claim 11, wherein the teleport source station script configures itself by setting a target of its teleport function to actual coordinates of the teleport target station object if actual altered target data has been identified in the broadcast message and the actual altered data are verified to be valid by checking a sequence number contained in the broadcast message.

14. The method of claim 11, wherein each broadcasted entry in the known teleport target locations list is monitored for such teleport target locations that are no longer in service by comparing an expiration timer of the actually monitored entry with a current time in the virtual world.

15. The method of claim 14, wherein the entry is deleted from the list of known teleport target stations if the entry has timed out.

16. A program product comprising a computer useable medium including a computer readable program, wherein the computer readable program when executed on a computer causes the computer to:

associate a specific teleport target station object with the at least one teleport target station;

associate a current location with the object; and broadcast the current location of the teleport target station object into at least one communication channel in the virtual world;

wherein a script running inside the teleport target station object:

determines actual coordinates of the teleport target station object it is running in as first data;

gathers second data by listening to broadcasts of one or more other teleport target station objects;

builds a list of known teleport target stations from the first and second data gathered; and broadcasts the known teleport target stations contained in the list to neighboring teleport target station objects.

17. A data processing system for execution of a data processing program, stored on a computer readable storage medium, the data processing program comprising software code portions for:

associating a specific teleport target station object with the at least one teleport target station;

associating a current location with the object; and broadcasting the current location of the teleport target station object into at least one communication channel in the virtual world;

wherein a script running inside the teleport target station object:

determines actual coordinates of the teleport target station object it is running in as first data;

gathers second data by listening to broadcasts of one or more other teleport target station objects;

builds a list of known teleport target stations from the first and second data gathered; and broadcasts the known teleport target stations contained in the list to neighboring teleport target station objects.

18. A data processing program for execution in a data processing system comprising software code portions for performing a method when the program is run on a computer, the method comprising:

associating a specific teleport target station object with the at least one teleport target station;

associating a current location with the object; and broadcasting the current location of the teleport target station object into at least one communication channel in the virtual world;

wherein a script running inside the teleport target station object:

determines actual coordinates of the teleport target station object it is running in as first data;

gathers second data by listening to broadcasts of one or more other teleport target station objects;

builds a list of known teleport target stations from the first and second data gathered; and broadcasts the known teleport target stations contained in the list to neighboring teleport target station objects.

* * * * *